(12) United States Patent
Ohran

(10) Patent No.: US 7,660,953 B2
(45) Date of Patent: *Feb. 9, 2010

(54) METHOD AND SYSTEM FOR MIRRORING AND ARCHIVING MASS STORAGE

(75) Inventor: Richard S. Ohran, Provo, UT (US)

(73) Assignee: EMC Corporation, Hopkinton, MA (US)

( * ) Notice: Subject to any disclaimer, the term of this patent is extended or adjusted under 35 U.S.C. 154(b) by 492 days.

This patent is subject to a terminal disclaimer.

(21) Appl. No.: 11/489,397

(22) Filed: Jul. 18, 2006

(65) Prior Publication Data

US 2006/0259721 A1 Nov. 16, 2006

Related U.S. Application Data

(63) Continuation of application No. 10/641,467, filed on Aug. 14, 2003, now Pat. No. 7,107,418, which is a continuation of application No. 10/157,427, filed on May 28, 2002, now Pat. No. 6,609,183, which is a continuation of application No. 09/255,486, filed on Feb. 23, 1999, now Pat. No. 6,397,307.

(51) Int. Cl.
*G06F 12/16* (2006.01)
(52) U.S. Cl. .................. 711/161; 707/202; 707/203; 707/204; 711/162
(58) Field of Classification Search .......... None
See application file for complete search history.

(56) References Cited

U.S. PATENT DOCUMENTS 5,668,991 A * 9/1997 Dunn et al. ............. 707/202
5,729,743 A * 3/1998 Squibb ................... 707/203

* cited by examiner

*Primary Examiner*—Reginald G Bragdon
*Assistant Examiner*—Thanh D Vo
(74) *Attorney, Agent, or Firm*—Van Pelt, Yi & James LLP

(57) ABSTRACT

A method and system for mirroring and archiving mass storage. A primary mass storage and a secondary mass storage are synchronized to contain the same data. Thereafter, a primary system tracks changes made to the primary mass storage. These changes are consolidated periodically into update files, the consolidations representing changes made to the primary mass storage during a time interval that ends when the primary mass storage is in a logically consistent state. These update files contain only those changes necessary to represent the modified state of the primary mass storage at the time of the update. The primary system then transfers the update files to a secondary system to bring the secondary mass storage current with the primary mass storage. The consolidation minimizes the amount of information that must be transferred and therefore allows for a relatively low band width communication channel. In addition, update files may be cached by the primary system so that requests for mirrored or archived data may be fulfilled by the primary system cache rather than requiring access to the secondary system.

21 Claims, 7 Drawing Sheets

METHOD AND SYSTEM FOR MIRRORING AND ARCHIVING MASS STORAGE

RELATED APPLICATIONS

This is a Continuation of application Ser. No. 10/641,467, filed Aug. 14, 2003, now U.S. Pat. No. 7,107,418, which is a Continuation of prior application Ser. No. 10/157,427, filed May 28, 2002, now U.S. Pat. No. 6,609,183, which is a Continuation of Ser. No. 09/255,486, filed Feb. 23, 1999, now U.S. Pat. No. 6,397,307 which is a hereby incorporated by reference.

BACKGROUND OF THE INVENTION

1. The Field of the Invention

The present invention relates to the protection of computer data, and more particularly to a system and method for mirroring and archiving data of one mass storage to another mass storage.

2. The Prior State of the Art

There is little question that computers have radically changed the way that businesses collect, manage, and utilize information. Computers have become an integral part of most business operations, and in some instances have become such an integral part of a business that when the computers cease to function, business operations cannot be conducted. Banks, insurance companies, brokerage firms, financial service providers, and a variety of other businesses rely on computer networks to store, manipulate, and display information that is constantly subject to change. The success or failure of an important transaction may turn on the availability of information which is both accurate and current. In certain cases, the credibility of the service provider, or its very existence, depends on the reliability of the information maintained on a computer network. Accordingly, businesses worldwide recognize the commercial value of their data and are seeking reliable, cost-effective ways to protect the information stored on their computer networks. In the United States, federal banking regulations also require that banks take steps to protect critical data.

Critical data may be threatened by natural disasters, by acts of terrorism, or by more mundane events such as computer hardware and/or software failures. Although these threats differ in many respects, they all tend to be limited in their geographic extent. Thus, many approaches to protecting data involve creating a copy of the data and placing that copy at a safe geographic distance from the original source of the data. Geographic separation may be an important part of data protection, but does not alone suffice to fully protect all data.

Often the process of creating a copy of the data is referred to as backing up the data or creating a backup copy of the data. When creating a backup copy of data stored on a computer or a computer network, several important factors must be considered. First, a backup copy of data must be logically consistent. A logically consistent backup copy contains no logical inconsistencies, such as data files that are corrupt or terminated improperly. Second, a backup copy of data must be current enough to avoid data staleness. The time between backups, which largely determines the staleness of the backup copy, must be sufficiently short so the data on the backup is still useful should it be needed. For certain applications, such as networks that store financial transactions, backups a week old may be useless and much more frequent backups are needed. How frequent backup copies can be made is a function of many factors such as whether the backup can be made during normal business operations, the time it takes to make a backup copy, and so forth.

In order to create a backup copy of the data, several approaches have been taken. Each of the approaches has certain advantages and disadvantages. Perhaps the simplest approach to creating a backup copy of critical data is to copy the critical data from a mass storage system, such as the magnetic storage system utilized by a computer network, to a second archival mass storage device. The second archival mass storage device is often a storage device designed to store large amounts of data at the expense of immediate access to the data. One type of archival storage commonly used is magnetic tape. In these backup systems, data is copied from the mass storage system to one or more magnetic tapes. The magnetic tapes are then stored either locally or at a remote site in case problems arise with the main mass storage system. If problems arise with the mass main storage system, then data may be copied from the magnetic tape back to either the same or a different mass storage system.

Although using magnetic tape or other archival storage as a means to guard against data loss has the advantage of being relatively simple and inexpensive, it also has severe limitations. One such limitation is related to how such backups are created. When data is copied from a mass storage system to a backup tape, the copy process generally copies the data one file at a time. In other words, a file is copied from the mass storage system onto the tape. After the copy is complete, another file is copied from the mass storage system to the tape. The process is repeated until all files have been copied.

In order to ensure the integrity of data being stored on the tape, care must be taken to keep the file from changing while the backup is being made. A simple example will illustrate this point. Suppose a file stores the account balances of all banking customers. If the account balances were allowed to change during the time the file is being backed up, it may be possible to leave a file in a logically inconsistent state. For example, if one account balance was backed up, and immediately after the account was backed up the account balance was debited $100.00, and if that same $100.00 was credited to a second account, then a situation may arise where the same $100.00 is credited to two different accounts.

In order to prevent such a situation from occurring, the data in a file must not change while the backup copy is made. A simple way to prevent data from changing is to prevent all access to the file during the backup procedure. In such a scheme, access to the files is cut off while the file is backed up. This approach is used by many networks where access to the mass storage system can be terminated after the close of business. For example, if a business closes at the end of each day and leaves its computer network essentially unused at night, user access to the network can be terminated at night and that time used to perform a backup operation. This, however, limits creation of a backup copy to once per day at off hours and therefore may be insufficient for some operations.

An increasing number of computer networks are used by computer businesses that operate world wide, and hence these networks may be needed twenty-four hours a day, seven days a week. Shutting down such a network for several hours each day to make a tape backup may have a significant adverse affect on the business. For such businesses, creating a backup tape in the traditional manner is simply impractical and unworkable.

In an attempt to accommodate such operations or to increase the frequency of backups, an approach to copying data stored on computer networks known as "data shadowing" is sometimes used. A data shadowing program cycles through all the files in a computer network, or through a selected set of critical files and checks the time stamp of each file. If data has been written to the file since the last time the shadowing program checked the file's status, then a copy of the file is sent to a backup system; The backup system receives the data and stores it on tapes or other media. The shadow data is typically more current than data restored from a tape backup, because at least some information is stored during business hours. However, shadow data may nonetheless be outdated and incorrect. For example, it is not unusual to make a data shadowing program responsible for shadowing changes in any of several thousand files. Nor is it unusual for file activity to occur in bursts, with heavy activity in one or two files for a short time, followed by a burst of activity in several other files. Thus, a data shadowing program may spend much of its time checking the status of numerous inactive files while several other files undergo rapid changes. If the system crashes, or becomes otherwise unavailable before the data shadowing program gets around to checking the critical files, data may be lost.

Another problem with data shadowing programs is that they typically do not work for data kept in very large files. Consider a system with a single very large database and several much smaller data files. Assuming that a business's primary information is stored in the large database, it is reasonable to expect that a large percentage of the business day will be spent reading and writing data to the very large database. Assuming that a backup copy could be made of the very large database, the time needed to make a backup copy of such a large database may make the use of data shadowing impractical. The data shadowing program may attempt to make copy after copy of the large database. Making such numerous copies not only takes a tremendous amount of time, but also requires a tremendous amount of backup storage space.

Another problem of data shadowing type systems is that open files are generally not copied. As previously described, a file must be frozen while a backup copy is made in order to prevent changes to the file during the backup process. Thus, data shadowing systems usually do not attempt to make copies of open files. If changes are constantly being made to a large database, the large database will constantly be open and data shadowing systems may not copy the database simply because the file is open. For at least these reasons, data shadowing systems are typically not recommended for very large data files.

Another approach that has been attempted in order to overcome some of these limitations is a process whereby a time sequence of data is captured and saved. For example, many systems incorporate disk mirroring or duplexing. In disk mirroring or duplexing, changes made to a primary mass storage system are sent to other backup or secondary mass storage systems. In other words, when a data block is written to the primary mass storage system, the same data block is written to a separate secondary mass storage system. By copying each write operation to a second mass storage system, two mass storage systems may be kept synchronized so that they are virtually identical at the same instant in time. Such a scheme protects against certain types of failures, but remains vulnerable to other types of failures.

The primary type of failure that disk mirroring overcomes is a hardware failure. For example, if data is written to two disks simultaneously, then if one disk fails, the data is still available on the other disk. If the two disks are connected to two separate disk controller cards, then if a single disk controller card or a single disk fails, then the data is still accessible through the other disk controller card and disk assembly. Such a concept can be extended to include entire systems where a secondary network server mirrors a primary server so that if a failure occurs in the primary network server, the secondary network server can take over and continue operation. The Novell® SFT line of products use variants of this technology.

While such systems provide high reliability against hardware failures and also provide almost instantaneous access to backup copies of critical data, they do not guard against software failures. As software becomes more and more complex the likelihood of software failures increase. In today's complex computing environments where multiple computer systems running multiple operating systems are connected together in a network environment, the likelihood of software errors causing occasional system crashes increases. When such a software error occurs, both the primary mass storage system and the mirrored mass storage system may be left in a logically inconsistent state. For example, suppose that a software error occurred during a database update. In such a situation, both the primary mass storage system and the mirrored mass storage system would have received the same write command. If the software error occurred while issuing the write command, both mass storage systems may be left in an identical, logically inconsistent state. If the mirrored mass storage system was the only form of backup in the network, critical data could be permanently lost.

If a backup is to be made at a remote location, the problems with the above technology are exacerbated. For example, if disk mirroring is to be made to a remote site, the amount of data transferred to the remote site can be considerable. Thus, a high speed communication link must exist between the primary site and the secondary or backup site. High speed communication links are typically expensive. Furthermore, if a time sequence of data is to be sent to a secondary system at a remote location over a communication link, then the reliability of the communication link becomes a significant issue. If for any reason the communication link should be temporarily severed, synchronization between the primary mass storage system and the secondary or backup mass storage system would be lost. Steps must then be taken to reconcile the two mass storage devices once the communication link is reestablished. Thus, mirroring a primary mass storage system at a remote site is typically difficult and very expensive.

The problems of mirroring a single system to a remote site becomes even more complicated when a single remote site is to service several primary systems. Since a remote disk mirror typically requires a dedicated communication link, the secondary system must be sufficiently fast to handle communications from a plurality of dedicated communication lines. The amount of data that must be received and stored by the secondary system may quickly overwhelm the capabilities of the secondary system.

It would, therefore, represent an advancement in the art to have a mirroring and archiving system that could ensure logical consistency of the data protected. It would also represent an advancement in the art to have a mirroring and archiving system that could function either locally or remotely using a low bandwidth communication link.

SUMMARY AND OBJECTS OF THE INVENTION

The foregoing problems in the prior state of the art have been successfully overcome by the present invention, which is directed to a system and method for mirroring and archiving a primary mass storage system to a secondary mass storage system. The current system and method provides several significant advantages over the prior art. First, the mirroring and archiving system and method of the present invention reduces the amount of data needed to mirror and archive by consolidating redundant changes and then transferring only those consolidated changes. Second, the system and method of the present invention emphasize security of the mirroring and archiving by ensuring that the primary storage system is in a logically consistent state when an update is made.

The present invention begins with the assumption that a primary mass storage system connected to a primary system and a secondary mass storage system connected to a secondary system contain identical data. This may be accomplished, for example, by making a complete copy of the primary mass storage system to the secondary mass storage system using either traditional backup techniques or traditional disk mirroring techniques. Once the primary mass storage system and the secondary mass storage system contain the same data, the present invention tracks the changes made to the primary mass storage system. This tracking is done by identifying new data written to storage locations in the primary mass storage system after the time that the secondary mass storage system was in sync with the primary mass storage system. By identifying those changes that have been made to the primary mass storage system, the invention identifies those changes that need to be stored at the secondary mass storage system in order to bring the secondary mass storage system current with the primary mass storage system.

Periodically, the changes that need to be made to the secondary mass storage system are assembled into an update. However, the update may contain redundant information. That is, multiple changes to a single data block present a historical view of a given storage location, but only the last change is necessary to bring the secondary mass storage system current with the primary mass storage system. Thus, the present invention minimizes the amount of data needed to resynchronize the mass storage devices by consolidating the redundant changes into a single, most recent change. Then, the update is sent to the secondary system to bring the secondary mass storage system current with the primary mass storage system. If desired, communication between the primary system and secondary system may be encrypted.

Because the present invention takes a state-oriented approach to the mirroring and archiving of a mass storage system, the amount of data that needs to be transferred can be optimized. Specifically, during any given time it is not unusual for a relatively small number of data blocks to be repeatedly and frequently modified, perhaps because the data blocks represent an index structure for a database. Each change in the underlying database would require corresponding changes to the index structure. Some observations of this activity indicate that of 15,000 changes made during one five-minute period, only 900 involved unique data blocks. Prior art systems would transfer each of the 15,000 changes. However, the state-oriented approach of the present invention allows for consolidating the 15,000 changes because only 900 are necessary to represent the final states of the unique data blocks that were modified. Therefore, the present invention is particularly well suited to mirroring and archiving data to a secondary system located at a remote site. The present invention can use low bandwidth communication links to transfer mirroring and archiving data to a remote site. As an example, in many cases conventional dial-up telephone lines with a 56.6 k baud modem will be entirely adequate for many situations.

The present invention also includes a cache holding area in the primary mass storage system. The cache holding area retains update files so that requests for mirrored or archived data often may be met without necessarily having to access the secondary system. Where the secondary system communicates with the primary system over a relatively slow link, the cache holding can dramatically improve the performance of accessing mirrored or archived data.

The secondary system of the present invention receives each update from the primary system. The update serves to bring the secondary mass storage system current with the primary mass storage system. In addition to this mirroring function, the updates also provide archiving. By retaining updates rather than integrating them with the synchronized data, the secondary system can deliver any of the logically consistent states that the updates represent. For example, if a problem occurs prior to a fourth update, the secondary system can combine the synchronized data with the first three updates. This combination represents the logically consistent state of the primary mass storage system as it existed at the time of the third update. Thus, the secondary system can provide any of a potentially large number of logically consistent states of the primary mass storage system. As the archival value of a given update diminishes over time, it can eventually be integrated with the synchronized data or collapsed with other updates, thereby limiting the number of updates stored at the secondary mass storage and the required size of the secondary mass storage.

Accordingly, it is an object of the present invention to provide a system and method for mass storage mirroring and archiving that minimizes the amount of data that needs to be transferred to a secondary system.

Another central object of the present invention is to provide a system and method for mass storage mirroring and archiving that can capture logically consistent states so that the secondary system is not found in a logically inconsistent state.

A further object of the present invention is to provide a cache of updates so that some requests for mirrored or archived data can be fulfilled without the delay that may be associated with accessing the secondary system.

Yet another object of the present invention is to allow the secondary system to capture successive logically consistent updates in order to provide a series of logically consistent primary mass storage system states.

Additional objects and advantages of the present invention will be set forth in the description which follows, and in part will be obvious from the description, or it may be learned by practice of the invention. The objects and advantages of the invention may be realized and obtained by means of the instruments and combinations particularly pointed out in the attended claims. These and other objects and features of the present invention will become more fully apparent from the following description and appending claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
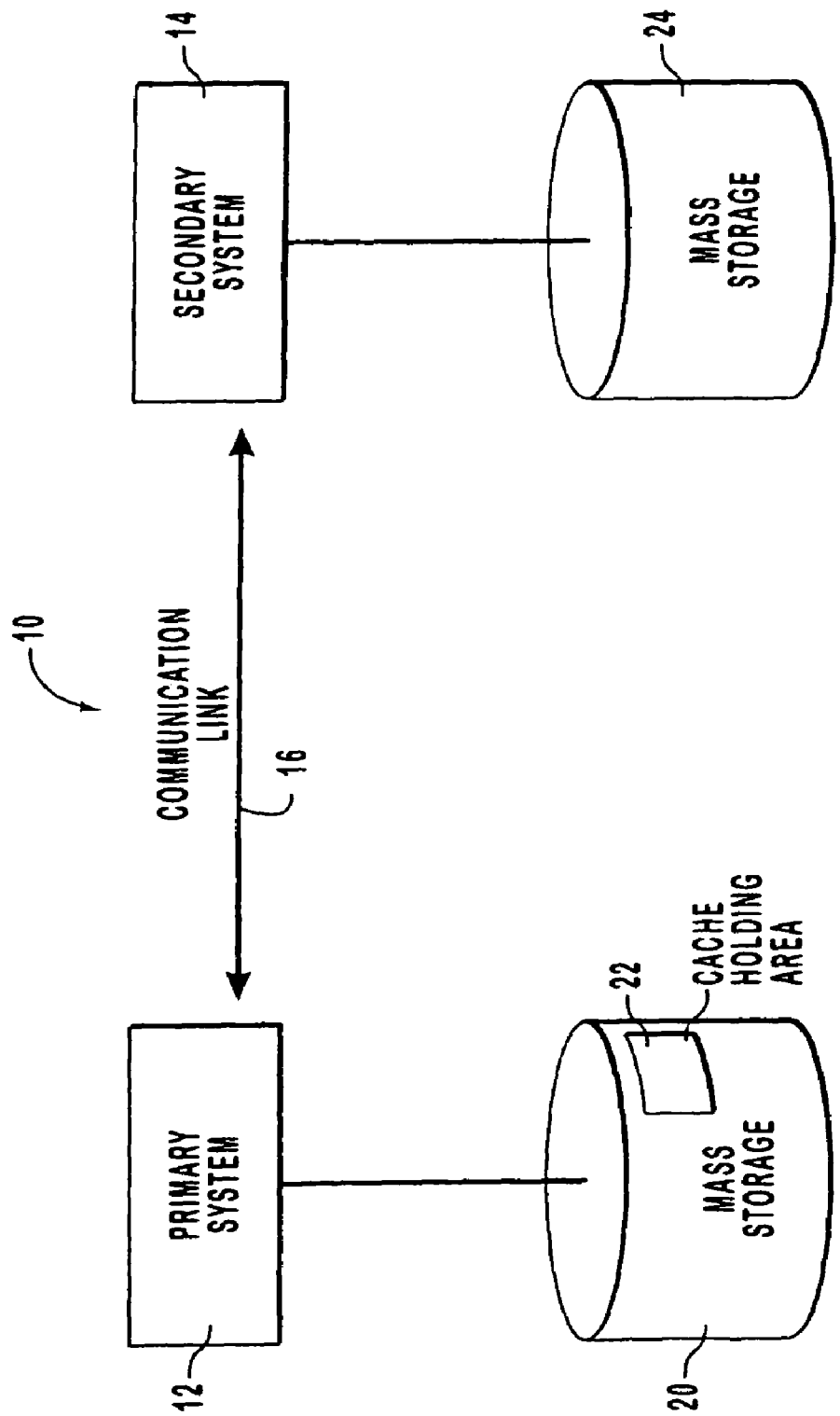
FIG. 1 is a block diagram representing a system for mirroring and archiving data stored in a primary mass storage according to the present invention.

The following invention is described by using diagrams to illustrate either the structure or the processing of certain embodiments to implement the system and method of the present invention. Using the diagrams in this manner to present the invention should not be construed as limiting of its scope. The present invention contemplates both a system and method for mirroring and archiving a primary mass storage system to a secondary mass storage system. The presently preferred embodiment of the system for mirroring and archiving a primary mass storage system to a secondary mass storage system comprises one or more general purpose computers. The system and method of the present invention, however, can also be used with any special purpose computers or other hardware systems and all should be included within its scope.

Embodiments within the scope of the present invention also include computer-readable media having encoded therein computer-executable instructions or data structures. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, magneto-optical storage devices, or any other medium which can be used to store the desired computer-executable instructions and data structures and which can be accessed by a general purpose or special purpose computer. Combinations of the above should also be included within the scope of computer-readable media. In turn, registers of a CPU or other processing unit that store computer-executable instructions or data structures while decoding and executing the same are also included within the scope of the computer-readable media.

Computer-executable instructions comprise, for example, executable instructions and data which cause a general purpose computer or special purpose computer to perform a certain function or a group of functions. The computer-executable instructions and associated data structures represent an example of program code means for executing the steps of the invention disclosed herein. U.S. Pat. No. 5,835,953 presents information that may be valuable to understanding the embodiments described below and is incorporated herein by reference.

Specifically, the current invention relates to the protection of computer data by maintaining a duplicate version. Duplicate or backup versions of computer data can be either historical or current in nature. Generally, duplicated historical data is described as "archived" and duplicated current data is described as "mirrored." As disclosed in greater detail below, the present invention uses one system, storing data in its mass storage, to provide both mirroring and archiving for another system, storing data in its mass storage. The mirroring and archiving system is designated as secondary to distinguish it from the system with data needing protection, designated as primary.

The process begins with synchronizing the storage of both primary and secondary systems to contain identical data. Thereafter, the primary system tracks any changes made to the primary mass storage. Those changes are later consolidated, either on-the-fly or after a selected period of time, to reflect only the most recent change made to each storage location of the primary mass storage. By discarding interim changes, the consolidation creates an update containing the least number of changes necessary to bring the secondary mass storage current with the primary mass storage. Once created, updates from the primary system are transferred to the secondary system through some communication link. Consolidating changes will allow a communication link to be of somewhat lower band width than would be necessary to transfer each individual change. The lower band width requirement makes the current invention more practical for use where a secondary system is located remotely from the primary system.

In addition, the primary mass storage may include a cache of recent updates. Data mirroring can be conducted by combining the synchronized secondary system and all updates, including any that might not have been sent to the secondary system, but remain in the cache. Data mirroring in this manner generates a volume of data that is the same as the data stored currently at the primary system. In addition, maintaining the cache can allow requests for mirrored or archived data to be met without any possible delay that a communication link may require. Furthermore, data encryption may be desirable for any information transferred over the communication link.

Referring now to FIG. 1, a block diagram of one embodiment of the of the present invention is illustrated. The system, shown generally as 10, comprises a primary system 12, a secondary system 14, and communication link 16 for transferring data between primary system 12 and secondary system 14. In FIG. 1, primary system 12 may be any type of networked or stand-alone computer system. For example, primary system 12 may be a network server computer connected to a computer network. Primary system 12 may also be a stand-alone system. Primary system 12 may also be a backup or standby server of a computer network connected to a primary server. The present invention can be used with any type of computer system. In this sense, the term "primary" is not meant to define or describe a computer system as a primary network server (as opposed to a backup or standby network server). In this description, the term "primary" is used to refer to the fact that the system has attached mass storage means for storing a copy of the data that is to be mirrored and archived. In other words, the term "primary" is used to differentiate the system from secondary system 14. Similarly, the term "secondary" merely identifies the system with attached mass storage means for mirroring and archiving the primary system 12.

Primary system 12 has attached thereto primary mass storage means for storing a plurality of data blocks in a plurality of storage locations. Each of the storage locations is specified by a unique address or other mechanism. The primary mass storage means can be any storage mechanism that stores data which is to be backed up using the present invention. For example, such mass storage means may comprise one or more magnetic or magneto-optical disk drives. It is, however, presumed that such mass storage means has a plurality of storage locations that can be used to store data blocks. The storage locations are addressed by a unique address or index so that a particular data block may be written thereto or retrieved therefrom. In FIG. 1, for example, the primary mass storage means is illustrated by primary mass storage 20.

The term "data block" will be used to describe a block of data that is written to or read from mass storage means. The term "data block" is intended to be broadly construed and should include any size or format of data. For example, the data stored in an individual sector on a disk is properly referred to as a data block. The amount of data stored in a group or cluster of sectors may also properly be referred to as a data block. If the primary mass storage means is a RAM or other word or byte addressable storage device, the term data block may be applied to a byte, a word, or multiple word unit of data. Furthermore, access to data blocks is independent of any particular file structure associated with the mass storage means according to an embodiment of the invention.

As described in greater detail below, embodiments within the scope of this invention use a cache holding area in the mirroring and archiving process. Embodiments within the scope of this invention therefore comprise cache holding means for storing updates of the primary mass storage means. This cache holding means provides access to the changed data of primary mass storage 20 without necessarily needing to access secondary mass storage 24. As described in greater detail below, such cache holding means may comprise any type of writable storage device such as RAM, EEPROM, magnetic disk storage, and the like. Such cache holding means may also comprise a portion of primary mass storage 20. In FIG. 1, such cache holding means is illustrated, for example, by cache holding area 22. The cache holding means is discussed in greater detail below.

Since primary system 12 may be any type of general purpose or special purpose computer, primary system 12 may also comprise any other hardware that makes up a general purpose or special purpose computer. For example, primary system 12 may also comprise processor means for executing program code means for executing the steps of the invention disclosed herein. The processor means may be a microprocessor or other CPU device. The processor means may also comprise various special purpose processors such as digital signal processors and the like. Primary system 12 may also comprise other traditional computer components such as display means for displaying output to a user, input means for inputting data to primary system 12, output means for outputting hard copy printouts, memory means such as RAM, ROM, EEPROM, and the like.

Secondary system 14 of FIG. 1 comprises secondary mass storage means for storing data blocks received from primary system 12. Secondary mass storage means can comprise any type of storage device capable of storing blocks of data received from a primary system. For example, secondary mass storage means may comprise a storage device identical to the mass storage device of a primary system. If the primary system has a large magnetic disk, for example, the secondary mass storage means may also comprise a large magnetic disk. As another example, secondary mass storage means may comprise archival storage devices such as a magnetic tape drive or an optical or magneto-optical drive. The type of storage devices that may be used for secondary mass storage means is limited only by the particular application where they are used. In some situations it may be more desirable to have a secondary mass storage means that more closely resembles the primary mass storage means. In other situations it may be perfectly acceptable to have archival type storage means that are optimized to store large amounts of data at the expense of rapid access. All that is required is that the secondary mass storage means be able to store data blocks transferred to the secondary system from the primary mass storage. In FIG. 1 the secondary mass storage means is illustrated by secondary mass storage 24.

In order to transfer data between primary system 12 and secondary system 14, communication link 16 is used. Communication link 16 is one illustration of communication means for transferring data between primary system 12 and secondary system 14. Communication link 16 may comprise any combination of hardware and/or software needed to allow data communication between primary system 12 and secondary system 14. For example, communication link 16 may be a local area network (LAN), a wide area network (WAN), a dial-up connection using standard telephone lines or high speed communication lines, the internet, or any other mechanism that allows data to flow between primary system 12 and secondary system 14. As explained in greater detail below, the present invention is designed to minimize the amount of data that flows between primary system 12 and secondary system 14. Only that data necessary to bring secondary mass storage 24 current with respect to primary mass storage 20 is transferred. This allows communication link 16 to encompass a wider variety of technologies that cannot be used with prior art systems. The bandwidth requirements for communication link 16 are typically very modest and a 56.6 k baud dial-up connection will be entirely adequate for many purposes.

Figure 6:
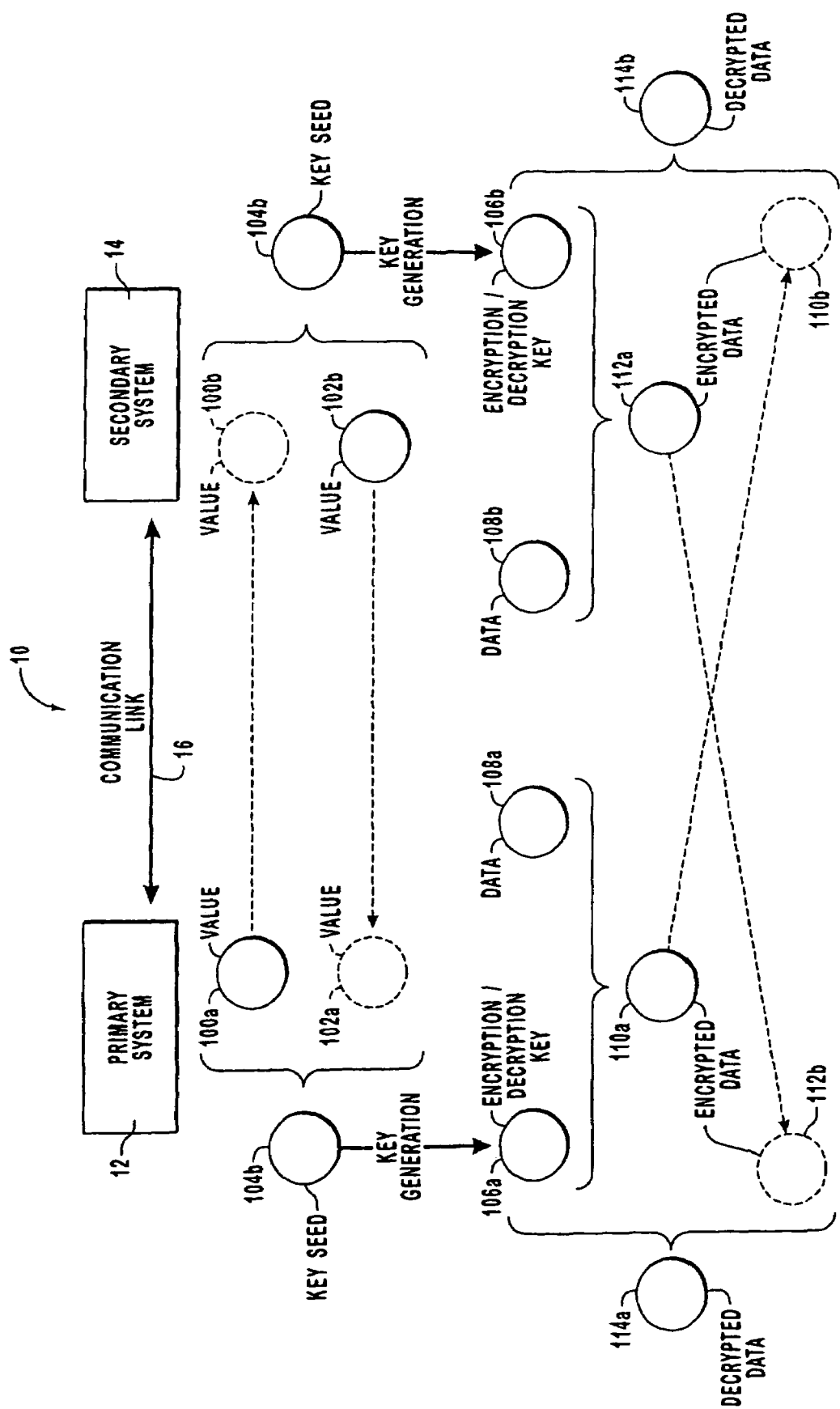
FIG. 6 is a schematic diagram illustrating one method for generating encryption and decryption keys for use with the invention.

As illustrated in FIG. 6, one embodiment of the current invention may determine that it is vital to maintain secret any information transferred using communication link 16. This may be true because communication link 16 is relatively unsecure or because the information transferred is highly sensitive. Many data encryption and decryption algorithms are well know to those skilled in the art. The current invention is not restricted to any particular one.

Encryption and decryption algorithms generally manipulate the data to be protected based on a key. Some keys require absolute secrecy to ensure the safety of an encrypted message while others include both a public and private component. Furthermore, algorithms for generating keys are also well known to those skilled in the art. Usually, encryption key generation is a pseudo-random process. In other words, generating a key requires some arbitrary starting point generally referred to as a seed. If two people coincidentally chose the same seed, the process generates identical keys.

The pseudo-random nature of the process is important to a preferred embodiment shown in FIG. 6. In order to improve the security of information transferred, primary system 12 and secondary system 14 dynamically generate the encryption keys they will use (as opposed to selecting keys from a predetermined set necessarily known to some number people and therefore subject to possible disclosure). One method for choosing keys involves each system selecting a value, designated as value 100a and value 102b. Next, primary system 12 and secondary system 14 exchange the selected values, yielding value 102a at primary system 12 and 100b at secondary system 14. After each system has the other's value, primary system 12 and secondary system 14 can mathematically manipulate (e.g., add) both values to generate identical key seeds, identified as key seed 104a and key seed 104b. Because each system knows both values, primary system 12 and secondary system 14 generate the same key seed (i.e., key seed 104*a* and key seed 104*b* are equal) and therefore can subsequently generate the same encryption and decryption keys, numbered as 106*a* and 106*b*. The embodiment may then use the keys generated to encrypt and decrypt some or all of the information transferred between the systems without ever having to share the encryption key over communication link 16. For example, primary system 12 encrypts data 108*a* using encryption key 106*a* to generate encrypted data 10*a*. Encrypted data 10*a* is transferred to secondary system 14 over communication link 16, resulting in encrypted data 110*b*. Secondary system 14 then uses decryption key 106*b* to decrypt encrypted data 110*b* and create decrypted data 114*b*.

As shown in FIG. 6, secondary system 14 can send encrypted data to primary system 12 using similar steps. Furthermore, multiple keys may be generated without having select, exchange and manipulate additional values. Generating multiple keys would allow primary system 12 and secondary system 14 to use any given key for a limited time.

Figure 2:
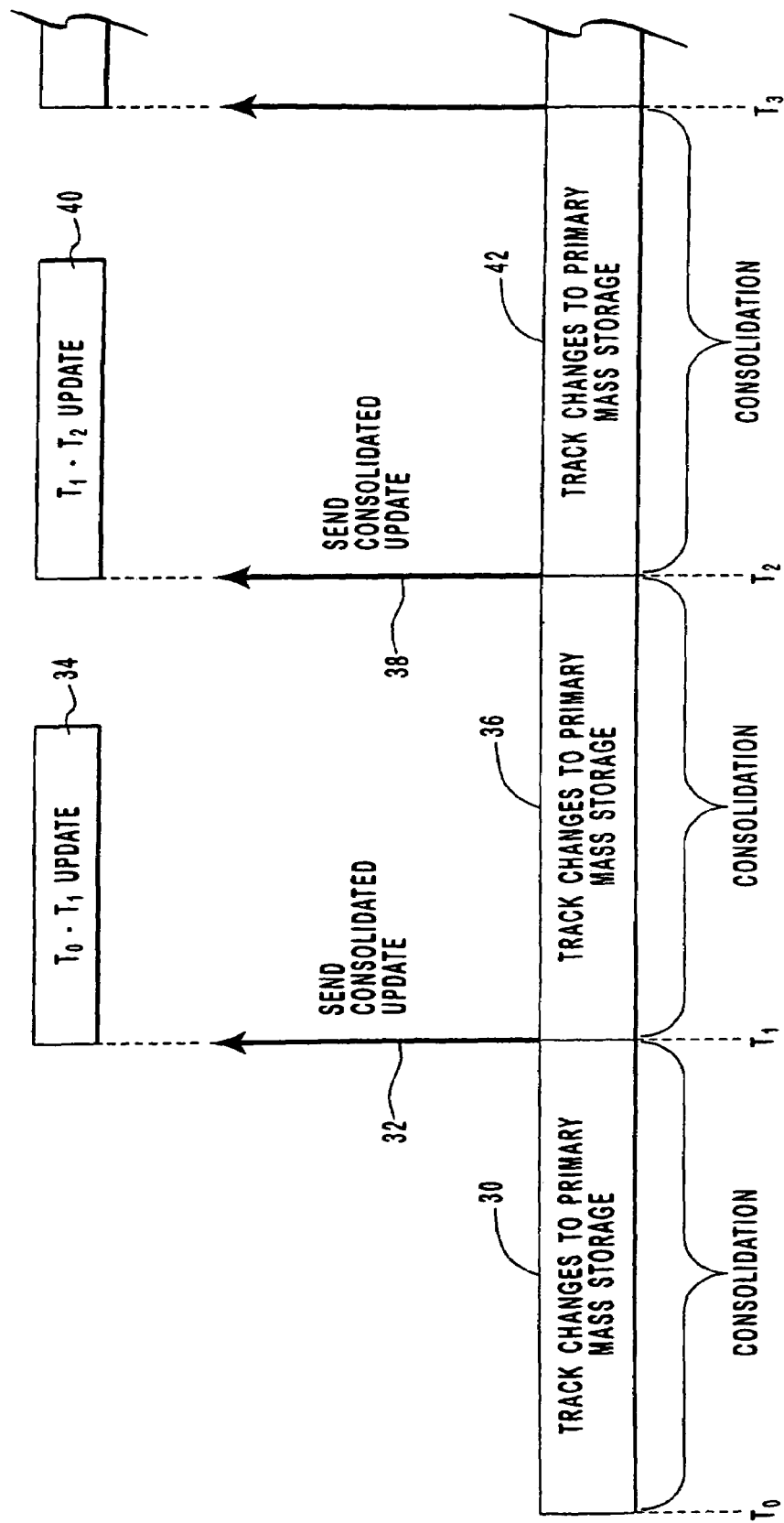
FIG. 2 is a diagram illustrating the timing by which updates are generated and consolidated according to one embodiment of the present invention.

FIG. 2 depicts the timing of one embodiment of the methods used to mirror and archive data stored at primary mass storage 20 of FIG. 1 to secondary mass storage 24 of FIG. 1. Initially, the timing illustrated in FIG. 2 presumes that the primary mass storage means and the secondary mass storage means are synchronized. In other words, the secondary mass storage means contains a copy of the data stored on the primary mass storage means. This may be accomplished using any number of conventional technologies. The type of technology used will depend in large measure on the type of media used for the secondary mass storage means. For example, if the secondary mass storage means is a disk similar to a disk used for the primary mass storage system, then traditional disk mirroring or other means may be used to copy the data from the primary mass storage means to the secondary mass storage means. On the other hand, if the secondary mass storage means uses magnetic tape or other type storage, then a backup may be made in the conventional way that such tape backups are made. In FIG. 2, the secondary mass storage means is assumed to have a current copy of the data stored on the primary mass storage means at time T0.

Beginning at time T0, the method summarized in FIG. 2 maintains the secondary mass storage means in a current state with respect to the primary mass storage means by capturing successive logically consistent states. This results in the secondary mass storage means either moving from one logically consistent state to a subsequent logically consistent state or allows the secondary mass storage means to capture succeeding logically consistent states. This creates a tremendous advantage over prior art systems that may leave the secondary mass storage means in a logically inconsistent state. By ensuring that the secondary mass storage means is in a logically consistent state, the present invention ensures that useable data is always available.

One example of situations in which data is found in a logically consistent state has been described herein in reference to financial transactions and other transactions in which the transaction is complete only when multiple locations of a mass storage system are appropriately changed. Another example in which data can be rendered logically inconsistent, or in a transition state, often occurs when the metastructure of a disk is changed in response to data storage activity. For instance, if data is to be stored to a particular file on a disk, the amount of memory allocated to the file may need to be increased. This can be accomplished by identifying free sectors listed in a free sector list on the disk and by adding one or more of the free sectors to the particular file. The free sector list is then modified to remove the reference to the newly allocated sectors. The data on the disk is in a logically inconsistent state between the moment that the newly allocated sector is referenced by the particular file and the moment when the same sector is removed from the free sector list. During this window of time, the same sector is referenced in the free sector list and by one of the files. Capturing only logically consistent states maintains the integrity of the data preserved by the updates and eliminates the problems that would otherwise arise from capturing data at logically inconsistent states such as those described herein.

Returning now to FIG. 2, beginning at time T0 the changes to the primary mass storage means are tracked. This tracking is preferably independent of any file structure associated with the primary mass storage means and is illustrated in FIG. 2 by block 30. For example, the tracking may occur at the disk level of the mass storage means. The changes are time-sequenced with multiple changes to a single storage location being individually and separately identified. At some point in time, it is desirable to transfer the changes to the secondary system. In a preferred embodiment, the primary system selects a logically consistent state of the primary mass storage means to transfer the changes, identified in FIG. 2 as time T1.

At or before time T1, the tracked changes are consolidated. In particular, the tracked changed can be consolidated at time T1 or on the fly between time T0 and time T1. The consolidated tracked changes are sent to the secondary system in the form of an update at time T1. Transmission of the consolidated update is illustrated in FIG. 2 by arrow 32 and block 34. An update is designed to preserve data as it exists at a particular point in time (i.e., T1, T2, etc.) that the data will be available, in its original state, even though subsequent changes are made to the primary mass storage. As such, updates need only contain the last change made to a storage location in the primary mass storage prior to the update time. The consolidation that occurs at or before time T1 eliminates any intermediate changes tracked during block 30.

Consolidation of the tracked changes can be conducted on-the-fly as indicated in FIG. 2. In other words, as tracked changes are accumulated, each storage location of the primary mass storage is represented by no more than one tracked change. When a new tracked change for a particular storage location is to be preserved, any earlier tracked change for the storage location is discarded. According to this technique, the tracked changes that remain at time T1 represent the consolidated update. Alternatively, all tracked changes accumulated between, for example, time T0 and T1, all but the most recent tracked change for each storage location of the primary mass storage are discarded, thereby creating the consolidated update 34. According to this alternative approach, consolidation is not on-the-fly, but is instead conducted at or after the end of the particular time material.

The foregoing techniques for consolidating the tracked changes can be combined, if desired. It is noted that performing consolidation on-the-fly reduces the storage volume needed to track changes, since only the most recent change for any particular storage location of the primary mass storage is retained. However, consolidating the tracked changes at, for example, time T1 preserves any intermediate changes, which may then be used to reconstruct compromised data of primary mass storage 20 at any time between times T0 and T1.

As used herein, "intermediate changes" include all changes made to the primary mass storage at a storage location that later has a subsequent change before the time that an update is created. For example, if a given storage location of the primary mass storage is changed ten times between time T0 and T1 the first nine changes are intermediate changes, whereas the tenth change is a last change that is included in the corresponding update. The term "intermediate state" as used herein, refers to any set of data stored in the primary mass storage during a time interval, such as the interval from time T0 to T1, other than the final set of data stored at the end of the time interval. Using the foregoing example, each of the first nine changes made to the given storage location during the time interval represent an intermediate state of the primary mass storage, while the tenth and final change represents a final state.

The importance of consolidation is demonstrated by examining the typical operation of mass storage; for example, a disk drive divided into sectors. Tracking changes over a period of time reveals that some sectors are changed frequently while others only change occasionally or not at all. In one particular instance, 15,000 total sector changes were tracked during a five-minute period. Only 900 of the 15,000 total changes involved unique sectors. Existing prior art systems simply pass changes in the primary mass storage along to the secondary system—all 15,000. In contrast, the present invention consolidates those changes, retaining only the last change made to each of the 900 altered sectors. Thus, the update of the present invention reduces the data that must be transferred from 15,000 to 900 sectors. Although the example speaks in terms of disks and sectors, the present invention is not limited to any particular storage means or corresponding subdivisions.

Since new data may be written to the primary mass storage means after time T1, a mechanism must be in place to identify the changes that are made after time T1 if another update is to be made after time T1. In FIG. 2, the changes after time T1 are tracked as indicated by block 36. This will allow the changes made after time T1 to be transferred to the secondary mass storage in order to bring the secondary mass storage current to some later time.

As illustrated in FIG. 2, the sequence described above repeats itself at time T2. This is illustrated by arrow 38, block 40, and block 42. As described previously, the update made at time T2 should represent a logically consistent state so that when the changes made between times T1 and T2 are transferred to the secondary mass storage, the secondary mass storage is brought current to a logically consistent state.

As explained in greater detail below, once an update has been transferred, the changes between times T0 and T1, T1 and T2, and Tn and Tn+1, etc., may be kept as incremental archives so that the logically consistent state at time T0, T1, T2, and Tn, etc., can be reconstructed if desired. Alternatively, as the archival value of particular updates decreases over time, those updates may be collapsed into a single update or updates may be integrated with the synchronized data stored in the secondary mass storage means in order to bring the secondary mass storage means current to the time represented by the most recent update that is integrated. Collapsing and integrating updates, shown in FIGS. 4A and 4B, respectively, are described in greater detail below.

An important difference from the prior art is highlighted in the above description. The above-described embodiment of the present invention transmits a consolidated update of changes and does not try to send to the secondary mass storage means the time sequence of changes that were made to the primary mass storage means. For example, if a single storage location were changed ten times from the time of a prior update and the current time, certain prior art systems would send ten changes to the secondary mass storage means. The present invention, however, simply sends the last change that was made before the current time. In this example, such a scheme reduces the amount of data sent to the secondary mass storage system by a factor of ten. The present invention reduces the amount of data sent to the secondary mass storage means to the very minimum needed to make a logically consistent mirror and archive of the data stored at the primary storage at selected moments in time. This allows the communication link between the primary system and the secondary system to be much lower bandwidth than prior art systems. The present invention is, therefore, ideally suited to embodiments where the secondary system is situated at a remote site from the primary system. When the secondary system is situated at a remote site, conventional dial-up telephone lines may be used to transfer updates between the primary system and the secondary system.

The present invention also supports a many-to-one embodiment. For example, consider a situation like that presented in FIG. 1, comprising a single secondary system but a plurality of primary systems. The secondary system could be situated either remotely or locally. The secondary system could then initiate contact with one primary system, receive the changes that have occurred since the last update from that system, and terminate the connection. A connection would then be established to another primary system and the secondary system could receive the changes that occurred on that primary system since the last update. Alternatively, such connections between primary and secondary systems may be constant. Thus, the secondary system contacts each primary system in turn and receives the changes that have occurred since the last time the primary system was contacted. Such an embodiment may be of great value to a business with many branch offices where copies of the data from these branch offices are to be stored at a central location.

The current invention is not restricted to tracking all changes made to the primary mass storage means. Alternative embodiments may alter the description of FIG. 2 by limiting or filtering the changes that are tracked in blocks 30, 36, and 42. Specifically, one alternative embodiment may track only changes associated with a particular physical or logical subdivision of primary mass storage means. For example, if primary mass storage means is a disk, it may be desirable to track only changes belonging to an identified partition of the disk. Another embodiment may track only changes associated with identified file(s) residing on the primary mass storage means. In yet another embodiment, certain changes could be filtered out during the update creation steps identified at arrows 32 and 38. Similar to limiting the changes tracked, filtering may be based on a physical or logical subdivision of the primary mass storage means such as a disk partition or identified file(s). The examples given above are by way of illustration only and are not intended as restrictions. One skilled in the art will recognize other criteria for either limiting or filtering tracked changes that will vary from one embodiment to another and are within the scope of the current invention.

Figure 3:
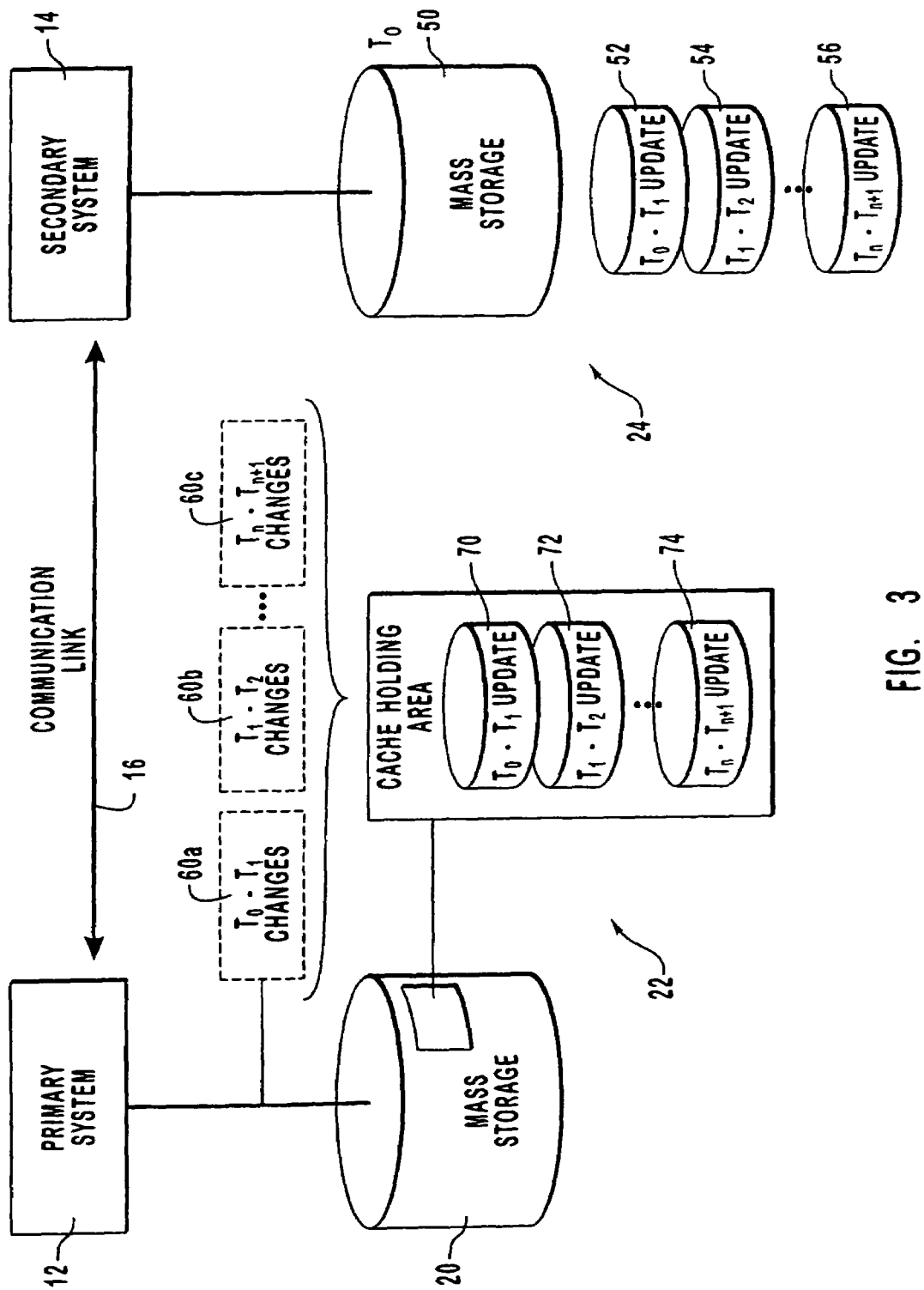
FIG. 3 is a block diagram showing the manner in which updates are generated and stored in one embodiment of the present invention.

Turning now to FIG. 3, a block diagram showing the processing details of one embodiment illustrated in FIG. 1 is presented. However, the timing of the information disclosed below is more fully presented in the preceding description of FIG. 2.

During normal operation of primary system 12, data is periodically written to attached primary mass storage 20. The processing of the embodiment depicted in FIG. 3 shows that the time sequence of changes to primary mass storage 20 are tracked according to the time interval when they occur. Blocks 60a, 60b, and 60c illustrate changes occurring over three such time intervals. As presented in the timing description of FIG. 2, these time intervals are preferably bounded by consistent states of primary mass storage system 20. Block 60*a* represents the changes occurring between some initial time T0 and a subsequent time T1. After identifying a consistent state at time T1, changes to primary mass storage 20 continue to be tracked, as represented by block 60*b*.

Because the time sequence of changes occurring between time T0 and time T1 likely includes multiple changes to a single storage location of primary mass storage 20, the tracked changes represented by block 60*a* are consolidated in an update. The update contains only the last change made to any storage location before time T1 and therefore the update only contains the minimum data necessary to bring secondary mass storage 24 current with primary mass storage system 20 as of time T1. As disclosed previously, consolidation of the tracked changes illustrated at block 60*a* can be consolidated on-the-fly or at time T1.

The embodiment illustrated in FIG. 3 places a copy of the T0-T1 update in cache holding area 22 of primary mass storage 20 and transfers a copy of the T0-T1 update to secondary system 14 using communication link 16. Block 70 represents the cache holding area copy and block 52 represents the secondary mass storage copy. Once an update is created, the corresponding time sequence of changes is no longer necessary. Thus, block 60*a*, representing the tracked changes between time T0 and time T1, is temporary in nature and can be deleted after the corresponding update is created.

The continued operation of primary system 12 results in further changes to primary mass storage 20. Tracking changes between time T1 and the time of some later consistent state of primary mass storage 20, say time T2, is illustrated by block 60*b*. Block 60*c* represents the continuing nature of tracking changes by using the notation of Tn, representing some arbitrary future consistent state, and Tn+1, representing a consistent state following Tn. The T1-T2 changes, identified as block 60*b*, are consolidated into an update either on-the-fly or at Time T2. FIG. 3 identifies the copy of the update corresponding to block 60*b* placed in cache holding area 22 as update 72 and the copy transferred to secondary system 14 using communication link 16 as update 54.

Although cache-holding area 22 is not necessary to archive data, it enables data stored in primary mass storage 20 to be fully mirrored. The updates and tracked changes that are stored at cache-holding area 22 and that have not yet been sent to secondary system 14 constitute part of the mirrored data. For example, during the period of time between times T1 and T2, tracked changes 60*b* are part of the mirrored data. Moreover, if there is a delay in sending consolidated updates to secondary system 14, these consolidated updates remain in cache-holding area 22 and are part of the mirrored data. For instance, consolidated update 60*a*, if is has not yet been sent to secondary system 14 after time T1, is part of the mirrored data.

Cache-holding area 22 can be part of primary mass storage 20. As such, the access time required for cache holding area 22 should be roughly comparable to the time required for accessing primary mass storage 20. In contrast, communication link 16 may be a dial-up connection using standard telephone lines. Thus, communication with secondary system 14 would be limited to the speed of the modems and phone lines used to implement communication link 16. Therefore, any time difference in accessing primary mass storage system 22 versus the possibly modem-connected secondary mass storage 24 represents the possible performance enhancement of cache holding area 22.

If cache-holding area 22 is part of primary mass storage 30, there should be some mechanism for ensuring that tracked changes 60*a*, 60*b*, 60*c*, etc. are preserved only for changes made to that portion of primary mass storage 20 that is not included in cache-holding area 22, the systems and methods described herein could interpret the preserved change as being data written to primary mass storage 20, thereby setting of an unlimited, or recursive, series of writes to cache-holding area 22.

Alternatively, cache-holding area 22 can be included in another mass storage device (not shown) apart from primary mass storage 20. This option eliminates the above-described recursion considerations. However, as can be understood, adding another mass storage device can increase the complexity and the cost of the system.

Over time, the number of updates stored may exhaust the space allocated to cache holding area 22. When this occurs, it will be necessary to delete an existing update before storing the next one. Because updates stored in cache holding area 22 are not necessary for mirroring or archiving once they have been sent to the secondary system, the decision of which update to delete is primarily a performance consideration. However, updates that have not yet been sent to secondary system 14, because of transmission delays or otherwise, are still needed for purposes of mirroring, and should not yet be deleted. One common practice for determining what data is least valuable to the performance of a cache is to identify the least recently used data. Other means for determining the relative value of information stored in a cache are well known in the art and are within the scope of the invention. When space allocated to cache holding area 22 is exhausted, the embodiment identifies the update or updates to be deleted and frees storage in cache holding area 22 for the current update.

Other than updates that have not yet been sent to secondary system 14, the contents of cache holding area 22 are not necessary for mirroring and archiving because secondary mass storage system 24 performs that function. Secondary mass storage 24 includes a time T0 copy of primary mass storage 20 designated as 50 in FIG. 3. In addition, secondary mass storage 24 retains the consolidated updates received through communication link 16. FIG. 3 shows T0-T1 update 52, T1-T2 update 54, and Tn-Tn+1 update 56. The Tn and Tn+1 notation indicates the continuing nature of the embodiment and identifies an update occurring at some future time.

The embodiment illustrated in FIG. 3 shows secondary mass storage 24 as including T0 secondary mass storage 50 (the T0 copy of primary mass storage 20) and subsequent updates from primary mass storage 20. The updates shown include T0-T1 update 52, T1-T2 update 54, and Tn-Tn+1 update 56. The embodiment achieves a current mirrored version of primary mass storage 20 by combining T0 secondary mass storage 50 with the received updates together with the unsent updates that remain in cache-holding area 22. An update indicates that T0 secondary mass storage 50 contains data that was subsequently changed and must be replaced with the data contained in the update. For example, if only T1-T2 update 54 indicates that a requested storage location of T0 secondary mass storage 50 must be altered to reflect the current data of primary mass storage 20, then update 54 provides the current data of the storage location. The most recent update containing data for any particular storage location provides the data to bring T0 secondary mass storage 50 current with primary mass storage 20. However, if no updates indicate a change to a storage location, the data from T0 secondary mass storage 50 is current. Furthermore, as each update preferably represents a consistent state of primary mass storage 20, the mirrored data of secondary system 14 will also represent a consistent state, whether the data comes from T0 secondary mass storage 50 or a subsequent update.

The mirroring and archiving functions of secondary mass storage 24 are closely related. By ignoring updates that occur after a given time, secondary system 14 can reconstruct the state of primary mass storage 20 at that time. The operation is identical to mirroring except that updates occurring after the time identified for the archive are not considered. Moreover, just as described in relation to mirroring, the updates represent consistent states of primary mass storage 20 and, therefore, so will the archival data.

Like cache holding area 22, secondary mass storage 24 may exhaust its storage space as it retains an increasing number of updates. Furthermore, over time, the relative archival value of some updates may decrease. This is not to say that any particular update will become worthless over time, but rather the resources of secondary mass storage 24 may impose constraints on the number of updates that can be stored simultaneously. When indicated by the space for storing updates becoming exhausted, the number of updates becoming unmanageable, a normal maintenance schedule, or any other appropriate reason, secondary system 14 takes one of two possible actions. As described more fully below, a group of updates may be collapsed into a single update or updates may be integrated with T0 secondary mass storage system 50.

In each case it may be desirable to preserve updates for future reference. Neither collapsing nor integration should be interpreted as precluding the continued storage of any information (update or otherwise) contained in secondary mass storage system 24 or its duplication elsewhere. Those skilled in the art will recognize other reasons for reducing the number of stored updates and the invention should not be limited by the specific reasons identified. Furthermore, the decision to collapse or integrate will likely consider factors that may change from one embodiment of the invention to another. All examples presented are for illustration purposes only and should not be viewed as limiting the invention. Specifically, the time intervals identified simply present ranges that may or may not be appropriate depending on the particular needs of a given embodiment.

Figure 4A:
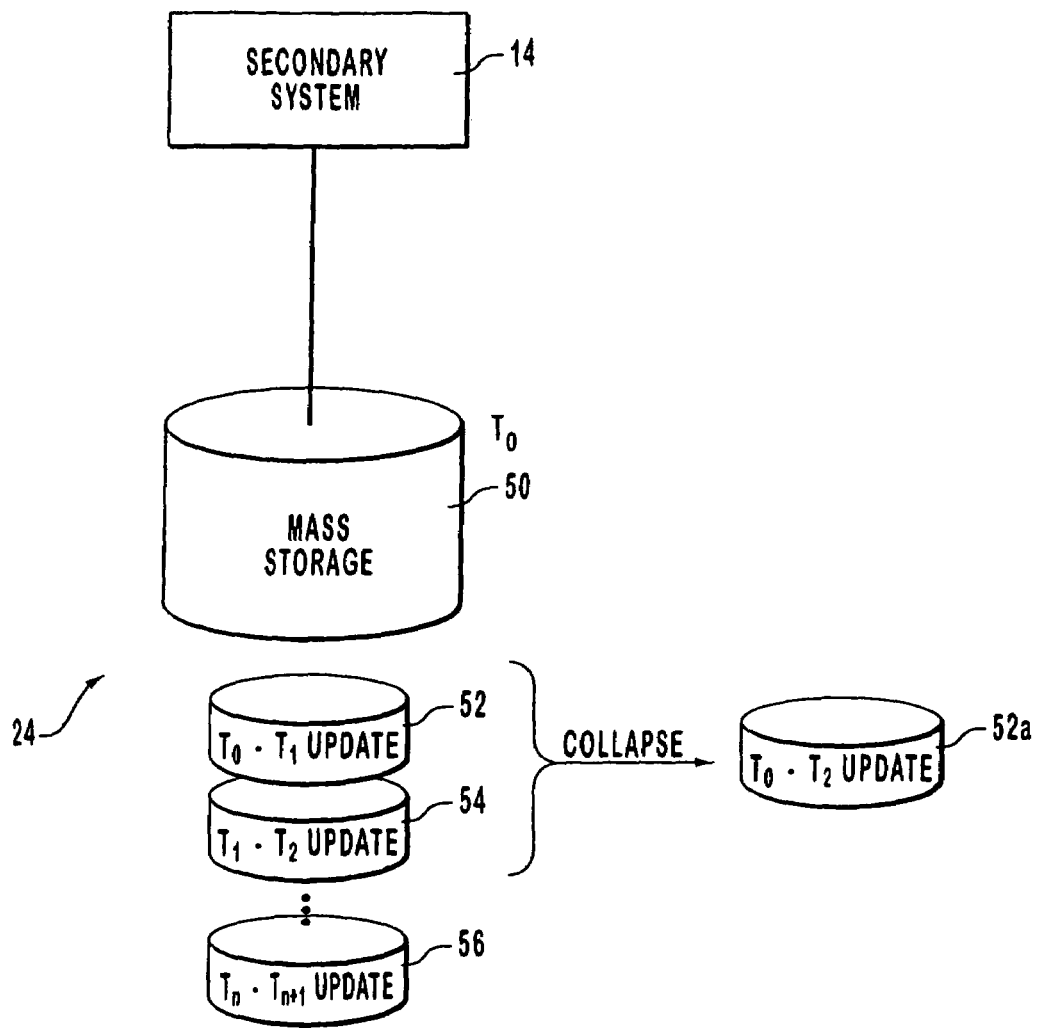
FIG. 4A illustrates multiple updates being collapsed into a single update at the secondary mass storage system of FIG. 3.

FIG. 4A illustrates secondary system 14 collapsing T0-T1 update 52 and T1-T2 update 54 into single T0-T2 update 52a. When secondary system 14 indicates that the number of updates stored should be reduced, the embodiment determines the relative value of some updates and collapses them. For example, updates may correspond roughly to five-minute intervals. Perhaps after a few hours, the updates can be paired together and collapsed to produce updates separated by roughly ten-minute intervals. In addition to reducing the number of updates by a factor of two, this example may also reduce the amount of storage required for the updates. To the extent that a prior update contains the same data relating to the same storage location as data of a later update, the data of the prior update can be eliminated. The reasoning is identical to that described above in conjunction with the consolidation that occurs when an update is created. Only the last state of any given storage location is necessary to mirror and archive that storage location. Intermediate values are superfluous.

Figure 4B:
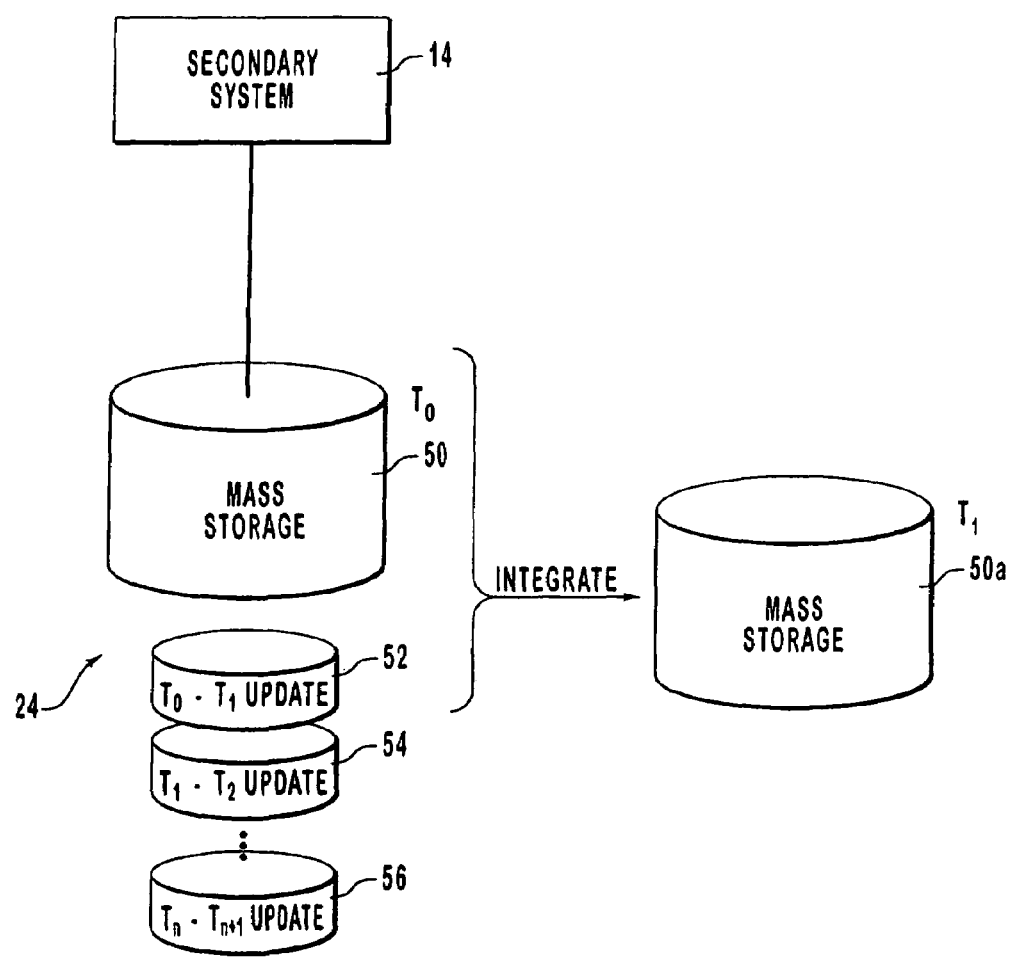
FIG. 4B illustrates an update being integrated with synchronized data stored at of the secondary mass storage system of FIG. 3.

Similarly, FIG. 4B shows secondary system 14 integrating T0 secondary mass system 50 with T0-T1 update 52 to produce T1 secondary mass storage 50a. Again, when secondary system 14 indicates that the number of updates stored should be reduced, the embodiment determines the relative value of some updates and the T0 secondary mass storage and integrates them. The decision to integrate rather than collapse depends on the relative archival value of the T0 secondary mass storage as compared to the updates that follow. For example, perhaps the oldest updates have been collapsed to the point that they are separated by roughly one day and T0 secondary mass storage 50 represents the state of primary mass storage 20 from eight days ago. In some applications it may be desirable to have the T0 secondary mass storage 50 represent data that is one week old. Therefore, T0-T1 update 52 may be integrated with T0 secondary mass storage 50 to advance the data of T0 secondary mass storage 50 one day. Thus, the data of integrated T1 secondary mass storage 50a would then be one week old.

Figure 5:
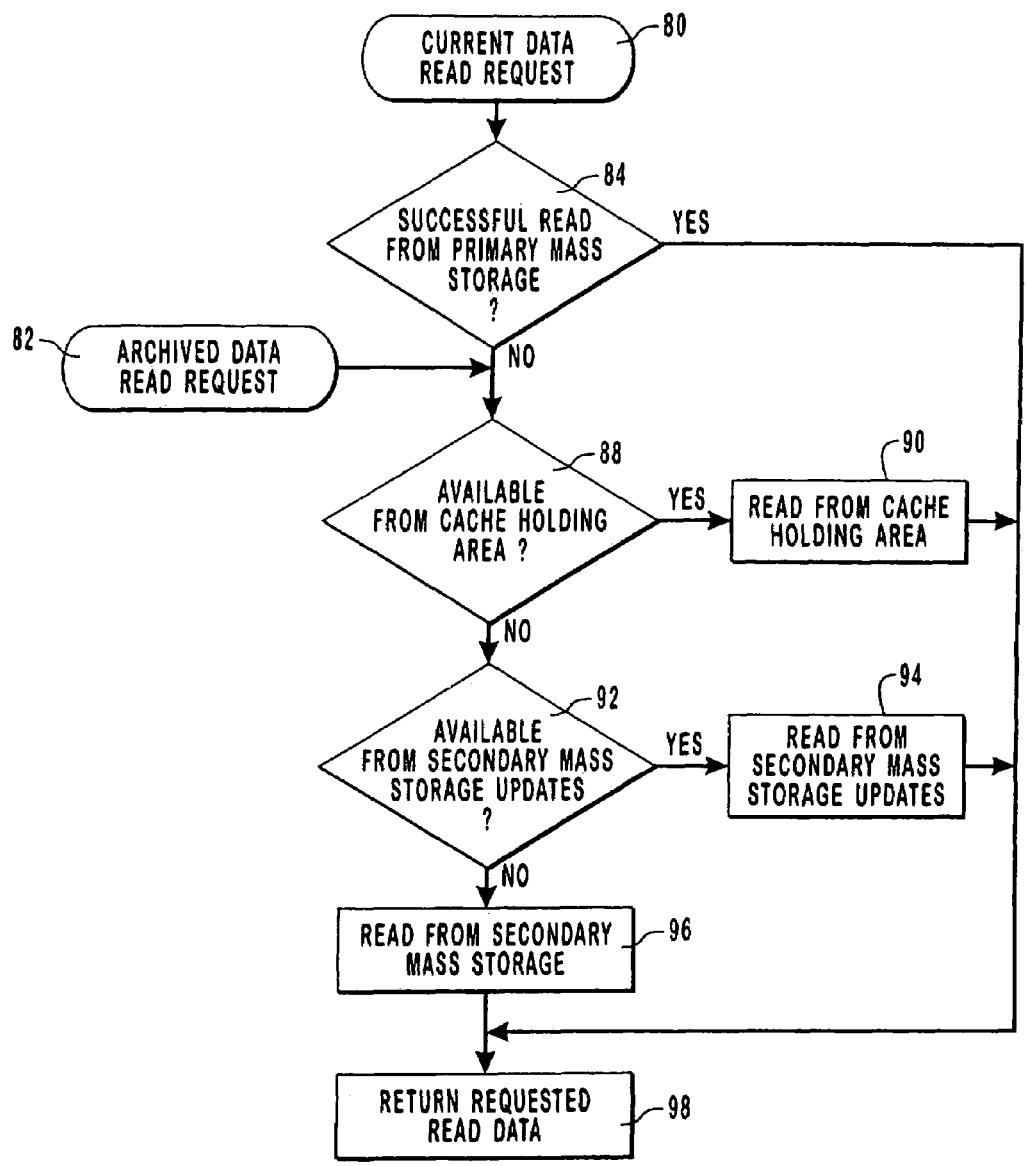
FIG. 5 is a flow diagram illustrating a method for reading mirrored and archived data according to one embodiment of the invention.

FIG. 5 illustrates one embodiment of the method of reading mirrored and archived data according to the invention. FIG. 5 shows two starting points; current data read request 80 and archived data read request 82. The two differ only in that current data read requests begins by attempting to read current data from primary mass storage, as shown in step 84, whereas archived data read requests necessarily skip the step of attempting to read current data from primary mass storage. If the read request from the primary mass storage system of step 84 is successful, no further processing is required and the data is returned in step 98.

Alternatively, if the primary mass storage system read in step 84 is not successful, the invention must turn to the mirrored data of the invention. The steps for reading mirrored data are analogous to the steps for reading archived data, with the exception that unsent data that remains in cache-holding area 22 is part of the mirrored data. Therefore, the steps for archived data read request 82 are essentially the same as those for a failed read from primary mass storage that requires reading from mirrored data. As such, the steps for both types of read requests, mirrored data and archived data, will be described together. Any step that refers to reading mirrored data is equally applicable to reading archived data. The only difference between reading mirrored data and reading archived data is that archived data read requests ignore changes to data that occurred after a particular time, while mirrored data read requests involve change that occur at any time, including those that might be contained in updates that have not yet been sent to secondary system 14, but remain at cache-holding area 22.

The first step in reading mirrored or archived data, identified as step 88, is to determine if the data is available in the cache holding area. When searching for archived data rather than mirrored data, changes occurring after a specified time will be ignored. If the data is available in the cache holding area, the data is read in step 90. Looking for data in the cache holding area first will likely improve performance because the time to access the cache holding area will generally be shorter than the time that would otherwise be required to access the secondary system in the subsequent steps of FIG. 5. Once read, the requested data is returned in step 98. However, if the data is not available in the cache holding area, it is necessary to proceed to step 92.

In step 92, the method determines whether the mirrored or archived data is available in the updates stored in secondary mass storage. In step 92, the invention searches for mirrored or archived data by examining the updates retained in secondary mass storage. The updates of secondary mass storage do not contain any different information from those located in the cache holding area. But, the cache holding area can generally store only a limited number of updates, whereas the secondary system stores all available updates. If the data is available in the secondary mass storage system updates, the data is read in step 94. After the data is read, it is returned in step 98. Otherwise, the method proceeds to step 96.

Step 96 represents reading data from the original or integrated copy of the primary mass storage that is stored at the secondary mass storage. This original or integrated copy includes any updates that may have been integrated with it as described above. If the data of primary mass storage has not been altered, a copy of that data will not appear in the updates stored at the cache holding area or the secondary mass storage, but instead can only be read from the original, synchronized copy stored at the secondary mass storage. After the data is read, the data is returned in step 98.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method of saving information comprising:
   tracking changes to a first mass storage;
   consolidating the tracked changes into an update by retaining only changes required to bring a second mass storage current with a logically consistent state of the first mass storage;
   transferring the update to a system associated with the second mass storage;
   wherein the system is configured to collapse after receipt at the system two or more updates associated with the first mass storage that have been received by the system but not yet integrated with synchronized data stored at the second mass storage and later integrate the collapsed updates with the synchronized data stored at the second mass storage; and
   wherein consolidating the tracked changes into the update includes retaining, for each storage location of the first mass storage that has changed during the tracking, information representing the most recent change to the particular storage location.

2. A method as recited in claim 1, wherein the changes to the first mass storage is tracked during a specified time interval.

3. A method as recited in claim 2, wherein the update does not include tracked changes that represent an intermediate state of the first mass storage that existed after a beginning and before an end of the specified time interval.

4. A method as recited in claim 2, wherein consolidating the tracked changes is conducted in an ongoing manner during the time interval.

5. A method as recited in claim 1, wherein tracking changes to the first mass storage includes tracking changes at a disk level of the first mass storage.

6. A method as recited in claim 1, wherein the update is encrypted before being transferred to the system associated with the second mass storage.

7. A method as recited in claim 1, wherein a copy of the update is stored in a cache holding area associated with the first mass storage.

8. A system for saving information comprising:
   a processor configured to tracking changes to a first mass storage, and consolidate the tracked changes into an update by retaining only changes required to bring a second mass storage current with a logically consistent state of the first mass storage;
   a communication interfaced configured to transfer the update to a second system associated with the second mass storage;
   wherein the second system is configured to collapse after receipt at the second system two or more updates associated with the first mass storage that have been received by the second system but not yet integrated with synchronized data stored at the second mass storage and later integrate the collapsed updates with the synchronized data stored at the second mass storage; and
   wherein the processor consolidates the tracked changes into the update including by retaining, for each storage location of the first mass storage that has changed during the tracking, information representing the most recent change to the particular storage location.

9. A system as recited in claim 8, wherein the changes to the first mass storage is tracked during a specified time interval.

10. A system as recited in claim 9, wherein the update does not include tracked changes that represent an intermediate state of the first mass storage that existed after a beginning and before an end of the specified time interval.

11. A system as recited in claim 9, wherein the processor consolidates the tracked changes in an ongoing manner during the time interval.

12. A system as recited in claim 8, wherein the processor tracks changes to the first mass storage including by tracking changes at a disk level of the first mass storage.

13. A system as recited in claim 8, wherein the update is encrypted before being transferred to the second system associated with the second mass storage.

14. A system as recited in claim 8, wherein a copy of the update is stored in a cache holding area associated with the first mass storage.

15. A computer program product for saving information, the computer program product being embodied in a computer readable medium and comprising computer instructions for:
   tracking changes to a first mass storage;
   consolidating the tracked changes into an update by retaining only changes required to bring a second mass storage current with a logically consistent state of the first mass storage;
   transferring the update to a system associated with the second mass storage;
   wherein the system is configured to collapse after receipt at the system two or more updates associated with the first mass storage that have been received by the system but not yet integrated with synchronized data stored at the second mass storage and later integrate the collapsed updates with the synchronized data stored at the second mass storage; and
   wherein consolidating the tracked changes into the update includes retaining, for each storage location of the first mass storage that has changed during the tracking, information representing the most recent change to the particular storage location.

16. A computer program product as recited in claim 15, wherein the changes to the first mass storage is tracked during a specified time interval.

17. A computer program product as recited in claim 16, wherein the update does not include tracked changes that represent an intermediate state of the first mass storage that existed after a beginning and before an end of the specified time interval.

18. A computer program product as recited in claim 16, wherein consolidating the tracked changes is conducted in an ongoing manner during the time interval.

19. A computer program product as recited in claim 15, wherein tracking changes to the first mass storage includes tracking changes at a disk level of the first mass storage.

20. A computer program product as recited in claim 15, wherein the update is encrypted before being transferred to the system associated with the second mass storage.

21. A computer program product as recited in claim 15, wherein a copy of the update is stored in a cache holding area associated with the first mass storage.

* * * * *